United States Patent
Rapthel et al.

(10) Patent No.: US 11,884,762 B2
(45) Date of Patent: Jan. 30, 2024

(54) COMPOSITION COMPRISING A GRAFTED POLYLACTIC ACID

(71) Applicants: BKY-Chemie GmbH, Wesel (DE); BYK Netherlands B.V., Deventer (NL)

(72) Inventors: Inno Rapthel, Wesel (DE); Frederik Piestert, Wesel (DE); Evert Jan Aalderink, Overijssel (NL); Lisa Höhm, Wesel (DE); Patricia Oostendorp, Wesel (DE); Thorsten Kröller, Wesel (DE); Andre Rapthel, Wesel (DE)

(73) Assignees: BKY-Chemie GmbH, Wesel (DE); BYK Netherlands B.V., Deventer (NL)

( * ) Notice: Subject to any disclaimer, the term of this patent is extended or adjusted under 35 U.S.C. 154(b) by 480 days.

(21) Appl. No.: 17/282,548

(22) PCT Filed: Oct. 7, 2019

(86) PCT No.: PCT/EP2019/077087
§ 371 (c)(1),
(2) Date: Apr. 2, 2021

(87) PCT Pub. No.: WO2020/074445
PCT Pub. Date: Apr. 16, 2020

(65) Prior Publication Data
US 2021/0340305 A1    Nov. 4, 2021

(30) Foreign Application Priority Data

Oct. 9, 2018  (EP) .................................... 18199292

(51) Int. Cl.
| | | |
|---|---|---|
| *C08F 290/14* | (2006.01) |
| *C08F 220/32* | (2006.01) |
| *C08F 220/06* | (2006.01) |
| *C08F 222/06* | (2006.01) |
| *C08J 5/18* | (2006.01) |
| *C08L 25/14* | (2006.01) |
| *C08L 67/04* | (2006.01) |

(52) U.S. Cl.
CPC ........ *C08F 290/141* (2013.01); *C08F 220/06* (2013.01); *C08F 220/325* (2020.02); *C08F 222/06* (2013.01); *C08J 5/18* (2013.01); *C08L 25/14* (2013.01); *C08L 67/04* (2013.01); *C08J 2367/04* (2013.01); *C08L 2203/16* (2013.01); *C08L 2203/30* (2013.01)

(58) Field of Classification Search
CPC ........ C08L 67/04; C08L 33/068; C08L 51/08; C08F 290/141; C08F 222/06; C08F 212/08
See application file for complete search history.

(56) References Cited

U.S. PATENT DOCUMENTS

| | | | |
|---|---|---|---|
| 6,552,144 B1 | 4/2003 | Campbell et al. | |
| 7,566,753 B2 | 7/2009 | Randall et al. | |
| 2008/0050603 A1* | 2/2008 | Randall ................ | C08G 63/912 428/480 |
| 2009/0312493 A1 | 12/2009 | Huang et al. | |
| 2011/0257323 A1* | 10/2011 | Hong ...................... | C08L 67/04 524/451 |
| 2012/0208947 A1* | 8/2012 | Zhu .......................... | C08L 35/06 524/502 |
| 2014/0080968 A1* | 3/2014 | Quintana .................. | D01F 6/50 525/61 |
| 2015/0037686 A1 | 2/2015 | Peña Hueso et al. | |

FOREIGN PATENT DOCUMENTS

| | | | |
|---|---|---|---|
| JP | 2011-032346 | * | 2/2011 |
| WO | 2014067923 A1 | | 5/2014 |

OTHER PUBLICATIONS

Al-Itry, Racha, et al., "Improvement of thermal stability, rheological and mechanical properties of PLA, PBAT and their blends by reactive extrusion with functionalized epoxy." Polymer Degradation and Stability, vol. 97, 2012, pp. 1898-1914.
Liu, Jianye, et al.., "Long chain branching polylactide: Structures and properties." Polymer, vol. 51, 2010, pp. 5186-5197.
International Patent Application No. PCT/EP2019/077087, International Search Report and Written Opinion, dated Dec. 3, 2019, 8 pages.

* cited by examiner

*Primary Examiner* — Mark S Kaucher
(74) *Attorney, Agent, or Firm* — Fitch, Even, Tabin & Flannery LLP

(57) ABSTRACT

A composition is provided comprising an epoxide functional polymer comprising epoxide functional groups, wherein the epoxide functional polymer has a number average molecular weight of 1000 to 10.000 g/mol and a grafted polylactic acid, wherein the polylactic acid is grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g.

21 Claims, No Drawings

COMPOSITION COMPRISING A GRAFTED POLYLACTIC ACID

FIELD OF THE INVENTION

The invention relates to a composition comprising a grafted polylactic acid. The invention further relates to a method for processing a polylactic acid blend and to a polylactic acid product obtainable by the method according to the invention.

BACKGROUND OF THE INVENTION

Polymers, which are based on renewable raw materials, are modified to increase their applicability to more applications areas. Polylactic acid is known as a renewable polymer, which can be used nowadays in many application areas. However, one of the disadvantages of polylactic acid is a limited melt strength of the polylactic acid raw material based on a linear structure of the raw material. A polylactic acid composition having a higher melt strength is desired for many applications of the polylactic acid, such as for preparing a polylactic acid film, e.g. blown films and cast films, and for preparing foamed products containing polylactic acid.

U.S. Pat. No. 7,566,753 describes a method for preparing a branched polylactic acid by reacting a polylactic acid with an epoxy-functional acrylate polymer to introduce long-chain branching into the polylactic acid polymer. The epoxy-functional acrylate polymer contains on average from 2 to 15 free epoxide groups per molecule. In the preparation method the epoxy-functional acrylate polymer is coupled to the polylactic acid by reaction of epoxide groups of the epoxy-functional acrylate polymer with carboxyl acid end groups of the polylactic acid. The resulting branched polylactic acid contains free epoxide groups.

In Polymer Degradation and Stability 97 (2012) 1898-1914 is described an improvement of thermal stability, rheological and mechanical properties of PLA, PBAT and their blends by reactive extrusion with an epoxy-functional acrylate polymer. In particular examples, the reactive extrusion of polylactic acid was performed with a styrene-acrylic copolymer, which is commercially available under the trade name Joncryl, which is described as chain extender/branching agent, and which contains glycidyl methacrylate monomers.

A polylactic acid containing film is prepared by melt processing a mixture of a polylactic acid, which contains carboxylic acid end groups, and said epoxy-functional acrylate polymer. The amount of said epoxy-functional acrylate polymer in the mixture is at most 1% by weight, wherein the % by weight is calculated on the total weight of the mixture.

The disadvantage of the use of said epoxy-functional acrylate polymer to modify the polylactic acid is that a melt processing for forming the branched polylactic acid is relatively slow due to a limited reactivity of the epoxide groups of the epoxy-functional acrylate polymer.

There is an ongoing need for polylactic acid polymers that alleviate the above-mentioned problems. Particular embodiments of the present invention aim at providing a composition, which enhances melt strength of a polylactic acid blend, which is processed in a melt processing step. Particular embodiments of the present invention aim at providing a method for processing a polylactic acid blend, which shortens a melt processing time for enhancing melt strength of the polylactic acid blend. Particular embodiments of the present invention aim at providing a polylactic acid product using an improved method for processing a polylactic acid blend.

SUMMARY OF THE INVENTION

The invention provides a composition comprising an epoxide functional polymer comprising epoxide functional groups, wherein the epoxide functional polymer has a number average molecular weight of 1000 to 10.000 g/mol and a grafted polylactic acid, wherein the polylactic acid is grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g.

The composition comprises an epoxide functional polymer comprising epoxide functional groups, wherein the epoxide functional polymer has a number average molecular weight of 1000 to 10.000 g/mol and a grafted polylactic acid having a total amount of carboxylic acid groups and carboxylic acid anhydride groups between 10.0 and 60.0 mg KOH/g. The amount of carboxylic acid groups and carboxylic acid anhydride groups of the grafted polylactic acid is higher than of a polylactic acid having only terminal acid end groups. The grafted polylactic acid contains acid groups and/or acid anhydride groups, which are bonded to the polylactic acid at positions along a chain of the grafted polylactic acid as a result of the grafting reaction.

In another embodiment, the invention provides a composition comprising an epoxide functional polymer comprising epoxide functional groups, wherein the epoxide functional polymer has a molecular weight per epoxide group in the range of 100 to 4000 g/mol and a grafted polylactic acid, wherein the polylactic acid is grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g.

In a different embodiment, the invention provides a composition comprising an epoxide functional polymer comprising epoxide functional groups and a grafted polylactic acid, wherein the polylactic acid is grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g.

In another aspect of the invention, a method is provided for processing a polylactic acid blend comprising the steps of:
 a. Providing:
  i. a polylactic acid, which contains carboxylic acid groups in an amount from 1.0 to at most 10.0 mg KOH/g,
  ii. an epoxide functional polymer comprising epoxide functional groups, wherein the epoxide functional polymer has a number average molecular weight of 1000 to 10.000 g/mol and
  iii. a grafted polylactic acid, wherein the polylactic acid is grafted with at least an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g;

b. mixing the provided components; and c. melt processing of the mixture.

In a further aspect is provided a polylactic acid product obtainable by the method according to the invention.

This invention provides a flexible and effective method for producing a polylactic acid product containing branched poly lactic acid resins. During melt processing of a mixture comprising the epoxide functional polymer and the grafted polylactic acid in combination with a regular polylactic acid, a branching reaction of the polylactic acid components is enhanced and accelerated. The branching reaction is enhanced by reaction of epoxide groups of the epoxide functional polymer with acid groups and/or acid anhydride groups of the grafted polylactic acid.

Excellent control over rheological properties of the polylactic acid product can be obtained with this invention. In particular a melt viscosity can be increased in a shorter time during the melt processing step of the method of a melt containing the grafted polylactic acid while maintaining other desired properties of the melt and/or the resulting polylactic acid product substantially constant. The branched polylactic acid polymers formed during the melt processing step exhibit, for example, reduced neck-in and greater web stability when processed in extrusion coating, compared to corresponding linear polylactic acid polymers, and are more easily processed in film and sheet extrusions, foaming, blow molding and extrusion foaming operations.

The Epoxide Functional Polymer (ii.)

The epoxide functional polymer comprises epoxide functional groups, wherein the epoxide functional polymer has a number average molecular weight of 1000 to 10.000 g/mol. The epoxide functional groups are reactive towards carboxylic acid groups during a melt processing step.

The average amount of epoxide groups of the epoxide functional polymer per molecule may be in the range from one epoxide group per molecule to 100 epoxide groups per molecule.

The advantages of the invention become particularly apparent when the epoxide functional polymer has an average amount of epoxide groups per molecule in the range 2 to 15 epoxide groups per molecule, preferably 3 to 10 epoxide groups per molecule, more preferably 4 to 8 epoxide groups per molecule.

The epoxide functional polymer may suitably have a molecular weight per epoxide group in the range of 100 to 4000 g/mol, preferably of 150 to 700 g/mol, more preferably of 20 to 400 g/mol. The epoxide functional polymer has a number average molecular weight of 1000 to 10.000 g/mol, suitably of 1500 to 5000 g/mol, more suitably of 1800 to 4000 g/mol. The number average molecular weight is determined by gel permeation chromatography (eluent: tetrahydrofuran, standard: polystyrene) according to DIN 55672 part 2 (year: 2008).

In an exemplary embodiment, the epoxide functional polymer is a copolymer being a polymerization product of an epoxide functional ethylenically unsaturated polymerizable monomer and another ethylenically unsaturated polymerizable monomer.

The epoxide functional polymer is prepared by polymerization reaction of the epoxide functional ethylenically unsaturated polymerizable monomer another ethylenically unsaturated polymerizable monomer. Said epoxide functional polymer can easily be prepared by the copolymerization reaction. Additionally, the molecular weight of the epoxide functional polymer and the average amount of epoxide groups of the epoxide functional polymer per molecule can easily controlled by selecting the amount of the epoxide functional ethylenically unsaturated polymerizable monomer and the amount of the other ethylenically unsaturated polymerizable monomer used for the copolymerization reaction.

In exemplary embodiments, the epoxide functional polymer is an acrylate copolymer prepared by at least one epoxide functional acrylate monomer and/or methacrylate monomer and at least one other acrylate monomer and/or methacrylate monomer.

The epoxy-functional monomer contains an epoxide group and at least one acrylic ($CH_2$=CH—C(O)—) or methacrylic ($CH_2$=C($CH_3$)—C(O)—) group. Glycidyl acrylate and glycidyl methacrylate are examples of such epoxy-functional monomers. The additional monomer may be, for example, a methacrylic monomer, an acrylic monomer, a vinyl aromatic monomer or a mixture of two or more of these. The additional monomer is "non-functional", by which it is meant the additional monomer is devoid of groups that will react with a PLA resin, particularly groups that are reactive with hydroxyl or carboxyl end-groups on the resin. The additional monomer may be, for example, acrylic acid, methacrylic acid, methyl methacrylate, ethyl methacrylate, butyl methacrylate, methyl acrylate, ethyl acrylate, butyl acrylate, isobutyl methacrylate, isobutyl acrylate, cyclohexyl methacrylate, cyclohexyl acrylate, isobornyl acrylate, isobornyl methacrylate, hydroxyethyl methacrylate, hydroxyethyl acrylate, hydroxybutyl methacrylate, hydroxybutyl acrylate, styrene, vinyl naphthalene and the like, or mixtures of two or more of the foregoing. Preferred copolymers are copolymers of the epoxy-functional acrylic or methacrylic monomer, at least one additional acrylate or methacrylate monomer, and a vinyl aromatic monomer such as styrene.

The acrylate polymer or copolymer is conveniently prepared according to polymerization processes described in U.S. Pat. No. 6,552,144.

Suitable acrylate copolymers are commercially available from BASF Resins B.V. under the trade name Joncryl®. Particularly preferred products include Joncryl® 4300, Joncryl® 4368 and Joncryl® 4369 polymers.

The Grafted Polylactic Acid (iii.)

The grafted polylactic acid is a polylactic acid grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g.

The total amount of carboxylic acid groups and carboxylic acid anhydride groups of the grafted polylactic acid is typically higher than of a polylactic acid having only carboxylic acid groups and/or carboxylic acid anhydride groups at the end of its polylactic acid chain or polylactic acid chains (in case of a branched polylactic acid resin). The grafted polylactic acid contains acid groups and/or acid anhydride groups, which are bonded to the polylactic acid at positions along a chain of the grafted polylactic acid as a result of the grafting process.

Preferably, the grafted polylactic acid additionally contains carboxylic acid end groups and/or carboxylic acid anhydride groups at the end of its polylactic acid chain or polylactic acid chains. The amount of carboxylic acid end groups and/or carboxylic acid anhydride groups may be in the range of 0.5 to 2.0 of said end groups per molecule, preferably of 1.0 to 2.0 of said end groups per molecule.

Preferably, the grafted polylactic acid has a catenated structure having two end groups. The catenated structure of the grafted polylactic acid has one polylactid acid chain.

Alternatively, the grafted polylactic acid has a branched structure, which has three or more end groups. The branched structure of the grafted polylactic acid has at least two polylactid acid chains, which are bonded to one another.

Examples of acid-functional ethylenically unsaturated polymerizable monomers are unsaturated carboxylic acid monomers having a carboxylic acid group.

Examples of acid anhydride-functional ethylenically unsaturated polymerizable monomers are ethylenically unsaturated polymerizable monomers having a carboxylic anhydride functional group or functional derivatives thereof.

Examples of unsaturated carboxylic acid monomers are those having from 2 to 20 carbon atoms, such as acrylic, methacrylic, maleic, fumaric and itaconic acids.

Examples of functional derivatives of unsaturated anhydride monomers include the monoester derivatives, the monoamide derivatives and the metal salts (such as the alkali metal salts) of these unsaturated anhydride monomers.

These grafting monomers comprise, for example, maleic, fumaric, itaconic, citraconic, allylsuccinic cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids, and maleic, itaconic, citraconic, allylsuccinic, cyclohex-4-ene-1,2-dicarboxylic, 4-methylcyclohex-4-ene-1,2-dicarboxylic, bicyclo [2.2.1]hept-5-ene-2,3-dicarboxylic and x-methylbicyclo [2.2.1]hept-5-ene-2,2-dicarboxylic anhydrides. Examples of the functional derivatives of the anhydride grafting monomers include the monoester, derivative, the monoamide derivative and the metal salts (such as the alkali metal salts) of the above mentioned exemplary anhydride monomers.

Preferred grafting monomer is maleic anhydride.

Said Grafting Reaction

The processing conditions for grafting the polylactic acid is suitably carried out in the presence of the radical generating agents, such as organic peroxides and azo compounds. Radical generating agents having a one hour half-life temperature ($T_{H/1h}$) in the range of 55 to 150° C. are preferred. Suitable examples are dialkyl peroxidicarbonates, such as dibutyl peroxidicarbonate and dicetylperoxidicarbonate ($T_{H/1h}$=65° C.);

dilaurylperoxide ($T_{H/1h}$=80° C.); dibenzoylperoxide ($T_{H/1h}$=91° C.); tert.-butylperoxy2-ethyl hexanoate ($T_{H/1h}$=91° C.); tert.-butylperoxy-isobutyrate ($T_{H/1h}$=98° C.); 1,1-di (tert.-butylperoxy)-cyclohexane ($T_{H/1h}$=113° C.), tert.-butylperbenzoate ($T_{H/1h}$=122° C.);

dicumylperoxide ($T_{H/1h}$=132° C.); 2,5-dimethyl-2,5-di (tert.-butylperoxy)-hexane ($T_{H/1h}$=134° C.); 2,5-dimethyl-2,5-di(tert.-butylperoxy)hexin-(3) ($T_{H/1h}$=141° C.); and di-tert.-butylperoxide ($T_{H/1h}$=141° C.).

The grafting reaction for grafting the polylactic acid is preferably carried out in the solid phase below the softening or melting temperature of the polylactic acid. An advantage of the solid phase reaction is the possibility to achieve a very low content of residual monomers, for example 0.01% by weight or less of residual monomer, calculated on the weight of the grafted polylactic acid.

In an exemplary embodiment, the grafted polylactic acid is grafted by a mixture of monomers comprising said acid-functional ethylenically unsaturated polymerizable monomer and/or said acid anhydride-functional ethylenically unsaturated polymerizable monomer and at least one ethylenically unsaturated polymerizable comonomer, which contains no acid-functional groups and no acid anhydride functional groups.

Said at least one ethylenically unsaturated polymerizable comonomer, which contains no acid-functional groups and no acid anhydride functional groups is also referred to as comonomer. These comonomers may be activating monomers for enhancing the grafting reaction of the above mentioned acid-functional and/or acid anhydride-functional ethylenically unsaturated polymerizable monomers.

By way of example of these activating comonomers, without this list being exhaustive in nature, include styrene monomers. In the present description, styrene monomer should be understood as meaning any monomer or combination of monomers having the chemical structure of styrene. As examples of styrene monomers, the following may be mentioned: styrene, α-methylstyrene, ortho-methylstyrene, meta-methylstyrene, para-methylstyrene, ethylstyrene, isopropenyltoluene, vinylnaphthalene, isopropenylnaphthalene, vinylbiphenyl, dimethylstyrene, tert-butylstyrene, hydroxystyrene, alkoxystyrenes, acetoxystyrenes, bromostyrene, chlorostyrene, vinylbenzoic acid, cinnamic acid or else alkyl cinnamates. Activating comonomers is also understood to include 1,1-diphenylethylene, stilbene, phenylacetylene, vinylpyridine, 2-isopropenylnaphthalene, butadiene, isoprene, dimethylbutadiene, cyclopentene, alkyl vinyl ethers, alkyl vinyl sulfides, phenyl vinyl ethers, alkylphenyl vinyl ethers, vinyl acetate, methyl methacrylate, naphthyl methacrylate, furan, indole, vinylindole, N-vinylpyrrolidone, N-vinylcarbazole and vinyl chloride. The styrene monomers represent the preferred activating comonomers and even more preferably is styrene.

There are no particular limitations with respect to the selection of the grafted polylactic acid. The grafted polylactic acid may be crystalline or partly crystalline, L or D or mixtures thereof, capped or uncapped or a blend.

For the purpose of this invention, the terms "polylactic acid", "PLA" and "lactide" are used to denote polymers having repeating units of the structure —OC(O)CH(CH$_3$)—, irrespective of how those repeated units are formed into the polymer. The PLA preferably contains at least 50%, such as at least 80%, at least 90%, at least 95% or at least 98% by weight of those repeating units.

A preferred PLA is a polymer or copolymer of lactic acid. Certain hydroxy acids, particularly α-hydroxy acids such as lactic acid, exist in two optical enantiomers, which are generally referred to as the "D" and "L" enantiomers. Either D- or L-lactic acid can be produced in synthetic processes, whereas fermentation processes usually (but not always) tend to favor production of the L enantiomer. Lactide similarly exists in a variety of enantiomeric forms, i.e., "L-lactide", which is a dimer of two L-lactic acid molecules, "D-lactide", which is a dimer of two D-lactic acid molecules and "meso-lactide", which is a dimer formed from one L-lactic acid molecule and one D-lactic acid molecule. In addition, 50/50 mixtures of L-lactide and D-lactide that have a melting temperature of about 126° C. are often referred to as "D,L-lactide". Polymers of any of these forms of lactide, or mixtures thereof, are useful in this invention. Increased optical purity (i.e., higher concentrations of the predominant enantiomer, which may be either the D- or L-enantiomer) tends to cause the resulting polymer to be more crystalline. When a semi-crystalline polymer is desired, it is preferred that the polymer contains either L- or D-lactic acid enantiomeric units alone or else contains a mixture of both L- and D-lactic acid units in which one of the enantiomers (either L- or D-) constitutes at most about 5.0 mole %, preferably up to about 3.0 mole %, more preferably up to about 2.0 mole %, and especially up to about 1.6 mole percent based on total moles of lactic acid repeating units. Particularly preferred semi-crystalline copolymers contain from 98.4 to 100.0% L isomer and from 0.0 to 1.6% D enantiomer (based on total moles of lactic acid repeating units). When more amorphous polymers are desired, the molar ratio of predominant to other enantiomeric repeating units in the copolymer is suitably from about 80.0:20.0 to about 98.0:2.0, preferably from 88.0:12.0 to 98.0:2.0, especially from about 90.0 to about 98.0% L-enantiomers and corresponding from about 10.0 to about 2.0% D enantiomers (based on total moles of lactic acid repeating units). Generally, the selection of enantiomer ratios will depend on the particular application and/or desired copolymer properties. In general, the higher the crystallinity, the higher are the thermal performance, dimensional stability and the modulus of the copolymer.

The Polylactic Acid (Component i.)

The polylactic acid, which is processed in the melt according to the method of the invention as a main component i. of the blend, is a polylactic acid, which contains carboxylic acid groups in an amount from 1.0 to at most 10.0 mg KOH/g. The polylactic acid is a polymer or copolymer of lactic acid as described above. The polylactic acid contains carboxylic acid end groups. The amount of carboxylic acid groups is at least 1.0 mg KOH/g. The carboxylic acid groups enhance a branching reaction of the polylactic acid with the epoxide groups of the epoxide functional polymer.

Preferably, the polylactic acid contains carboxylic acid end groups and/or carboxylic acid anhydride groups at the end of its polylactic acid chain or polylactic acid chains. The amount of carboxylic acid end groups and/or carboxylic acid anhydride groups may be in the range of 0.5 to 2.0 of said end groups per molecule, preferably of 1.0 to 2.0 of said end groups per molecule.

The Composition

The composition of the epoxide functional polymer, which comprises epoxide functional groups, and the grafted polylactic acid may be a dry blend, such as a dry blend of particles. Preferably, the components of the composition are mixed together in a solid state of the components. This has the advantage that the epoxide functional polymer and the grafted polylactic acid have substantially not reacted with each other before melt processing the composition together in a blend with a further component, such as a regular, ungrafted, polylactic acid.

In an exemplary embodiment, the composition comprises a blend of particles containing the epoxide functional polymer and particles containing grafted polylactic acid.

Preferably, the blend of particles is compressed, such as compacted, at a relatively low temperature.

Alternatively, the components in the composition are blended or mixed at a reasonable low temperature and/or at a reasonable short time, such that a minimal of reactions has occurred between the epoxide functional polymer comprising epoxide functional groups and the grafted polylactic acid in the composition.

In an exemplary embodiment, the composition is in the form of particles, wherein each of the particles comprises a core and a first coating covering at least a part of the surface of the core, wherein the core comprises the epoxide functional polymer and the first coating comprises the grafted polylactic acid.

The first coating may be arranged for covering a part of the surface of the core or may be arranged for covering substantially the whole surface of the core. Preferably, the first coating is arranged for substantially enclosing the core of the particle. More preferably, the first coating is arranged for substantially encapsulating the core of the particle. The first coating provides at least in part a protection of the epoxide functional polymer, which is contained in the core.

In this way, a preliminary reaction of epoxide groups of the epoxide functional polymer is prohibited or reduced.

Moreover, the particles having the core and the first coating provide a suitable measure of controllably adding the components of the composition to another polylactic acid, to form a polylactic acid blend. For example, the particles may be advantageous for evenly dosing the composition to a stream in a melt processing apparatus, such as an extruder.

Preferably, the epoxide functional polymer and the grafted polylactic acid are contained in the particles in a weight ratio desired for melt processing of the components in a polylactic acid blend.

In embodiments, the epoxide functional polymer in the particles may be contained partly in the core and partly in the first coating. Preferably, the epoxide functional polymer in the particles may be contained completely in the core of the particles.

The first coating may be an outer coating of the particle.

The particles may have a substantially round shape, having a substantially round core and a first coating encapsulating said core. Alternatively, the particles may have any other shape, such as a cylindrical shape, wherein the core is at least partly covered by the first coating and wherein the first coating at least partly surrounds the core.

The particles having a core and a first coating may be obtained in any suitable way.

In an example, the particles may be pellets formed in a coextrusion process. Said pellets may be produced by a process containing the steps of: coextrusion of the first coating to form a tube and the core wherein the core is encapsulated by the first coating; cooling the filled tube; passing the filled tube through a means for cutting of the tube into multiple discrete segments, thereby forming multiple encapsulated pellets. Additionally, the cutting of the tube into multiple discrete segments may be assisted with sealing of the ends of the cutpellets. The closed end pellets are at least partly sealed at each end of the tube from which the pellet is made.

In embodiments, the diameter of the pellets and the ratio between the weight of the core and the weight of the first coating are adjusted by using suitable machine settings, such throughput settings.

The coextrusion process provides the advantage that the core material and the polymer for the first coating are melt processed separately and the first coating and that the core and first coating contact each other only after formation of the tube at the extrusion die. As such, a mixing of the epoxide functional polymer of the core and the grafted polylactic acid of the first coating in a melt is prevented and a reaction of the epoxide functional polymer of the core with the grafted polylactic acid of the first coating is minimized. Additionally, the formed pellets may be additionally cooled further directly after being formed.

An example of a process for producing closed end pellet is further described in the detailed description.

Additionally, the advantages of the particles become particularly apparent when the grafted polylactic acid in a first, outer, coating is mixed with another polylactic acid. In an exemplary embodiment, the first coating additionally comprises the polylactic acid, which contains carboxylic acid groups in an amount from 1.0 to at most 10.0 mg KOH/g. The addition of the other polylactic acid to the outer first coating provides the advantage that the outer first coating is less sensitive to moisture, which supports a control on handling processes of the particles, such as feeding and dosing of the particles. Additionally, the carboxylic acid groups of the additional polylactic acid in the first coating can also react with the epoxide functional polymer contained in the core during melt processing of the particles in a blend.

Additionally, the advantages of the invention become particularly apparent when the ratio between the epoxide functional polymer and the grafted polylactic acid is such, that during melt processing of the composition substantially all epoxide groups of the epoxide functional polymer react with carboxlic acid groups or their derivatives, which are contained in the components of the melt. The total amount of carboxlic acid groups available for reaction with the epoxide groups comprises the carboxlic acid groups contained in the grafted polylactic acid. In particular, the total amount of carboxlic acid groups, which are available for reaction with the epoxide groups in the melt, further includes carboxlic acid groups of other components, such as a regular non-grafted polylactic acid, included in the blend, which is melt processed. In an exemplary embodiment, the weight ratio between the epoxide functional polymer and the grafted polylactic acid is from 2:1 to 1:2. Said weight ratio may be the weight ratio in said composition without any further components and may be the weight ratio of a blend comprising the epoxide functional polymer and the grafted polylactic acid and a further component, such as a regular, ungrafted, polylactic acid.

The Method for Processing the Polylactic Acid Blend

The product of the method for processing the polylactic acid blend is a polylactic acid product containing branched poly lactic acid resins. During melt processing of a mixture comprising the epoxide functional polymer and the grafted polylactic acid in combination with a regular polylactic acid, a branching reaction of the polylactic acid components is enhanced and accelerated. The polylactic acid blend comprises a regular polylactic acid, the epoxide functional polymer and the grafted polylactic acid.

In an exemplary embodiment of the method, in step a. the component i. and the component ii. are provided as a composition according to the invention.

In an exemplary embodiment of the method, the composition is provided in the form of particles according to the invention. As mentioned above, the particles of the composition provide advantages in controlling the amount of composition in the polylactic acid blend, which is formed during step b.

In an exemplary embodiment of the method, the grafted polylactic acid is provided in an amount of 0.1 to 2.0% by weight, preferably in an amount of 0.1 to 1.0% by weight, wherein the % by weight is calculated on the weight of the components i., ii. and iii. in the mixture.

In an exemplary embodiment of the method, said epoxide functional polymer is provided in step a.i. in an amount of 0.1 to 2.0% by weight, preferably in an amount of 0.1 to 1.0% by weight, wherein the % by weight is calculated on the weight of the components i., ii. and iii. in the mixture.

In an exemplary embodiment of the method, the weight ratio between the epoxide functional polymer ii. and the grafted polylactic acid iii. provided in step a. is from 2:1 to 1:2.

It has been found, that the branching reaction is enhanced by reaction of epoxide groups of the epoxide functional polymer with acid groups and/or acid anhydride groups of the grafted polylactic acid. As a result, the melt processing of the polylactic acid blend can be performed in a shorter time before the desired rheological properties are obtained.

In an exemplary embodiment of the method, the melt processing is performed from 30 seconds to 120 seconds, preferably from 30 seconds to 60 seconds, at a temperature between 150° C. and 250° C.

In an exemplary embodiment of the method, the melt processing comprises forming a film that comprises the melt processed mixture. The melt obtained during the melt processing exhibits excellent rheological properties for forming a film. Said film forming step may be a film extrusion step, may be a film blowing step and may be a film casting step.

DETAILED DESCRIPTION

Measurement of Acid Numbers

The acid number is the KOH quantity in mg that is required for neutralizing 1 g of substance under the defined conditions. The acid numbers were determined by a neutralization reaction with a 0.1 N KOH in Ethanol according to DIN EN ISO 2114.

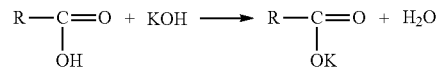

Die Swell

During the extrusion of the polymer melt through a die restriction the polymer melt is deformed by the die. Due to the viscoelastic properties of the polymer melt a part of the deformation is reversible. The retardation of the polymer molecules, which are oriented due to the passing through the die restriction, is described as entropic elasticity. The extruded polymer melt obtains a cross section diameter di outside the die, which cross section diameter is enlarged due to this effect compared to the cross section diameter $d_0$ of the restriction of the die.

As the amount of die swell is a.o. dependent on the branching and on the molecular weight of the polymer, a determination of die swell during a measurement of melt flow rate index according to ISO 1133 is an easy way to combine the determination of both properties at the same time.

The measurements were performed by the following steps:

Drying the granulate of the grafted polylactic acid during 4 hours at 80° C.;
Determining the melt flow rate for 10 min at 210° C./2.16 kg;
During the melt flow rate measurement cut of 2 cm long strands of the polymer melt;
Allowing the polymer strands to cool to room temperature;
Measuring a cross section diameter D of the polymer strands (D unrelaxed);
Tempering the polymer strands during 15 minutes in a warm silicon oil bath (at temperature T);
Cleaning the polymer strands with ethanol, and
Determining a cross section diameter D of the polymer strands (D relaxed).

The strand widening is calculated according to:

$$SA(\text{unrelaxed}) = (D \text{ unrelaxed}/2.095) - 1$$

$$SA(\text{relaxed}) = (D \text{ relaxed}/2.095) - 1$$

wherein D unrelaxed and D relaxed are expressed in [mm].

Melt Strength

The determination of the melt strength of a polymer melt by a rheology measurement is described a.o. in Meissner, J, Dehnungsverhalten von Polyathylen-schmelzen, Rheologica Acta, 10 (1971), 230-242.

The measurements were performed on a Rheotens 71.97 Feeder—HCV Rheograph. The following parameters of were used:
Parameter HCV:
Die: round capillary 30.0/2.0/180
Temperature: 180° C.
Soak time: 10 min
Piston speed: 0.265 mm/s
Parameter Rheotens:
Acceleration: 24 mm/s$^2$
Gap between die and wheels: 100 mm
Gap between wheels: Dial 3
Standard wheels
Samples have been dried @80° C. for 3 hours
The value of F max (in cN) is taken as measure for the melt strength of the polymer melt.

Closed End Pellets

A process is known for making closed end pellets, which comprises a core material, which comprises at least the epoxide functional polymer, and an outer layer having a polymeric material comprising the grafted polylactic acid. The outer layer encapsulates the core material substantially completely. The process comprises co-forming a tube comprised of an outer polymeric layer and forming a core material, which comprises the epoxide functional polymer, by simultaneously feeding the polymer for the outer layer in one part of an extruder, and feeding the core material into another part of the same extruder and co-extruding the outer layer and the core, thereby forming a polymeric tube filled with the core material. The filled tube is cooled first and then passed into a closing device (e.g., a gearwheel) for sealing, whereby the gearwheel simultaneously seals/welds and cuts the polymeric tube filled with the core material into multiple discrete segments. The formed segments are then cooled further and excess moisture will be removed before going through a separator to be packaged.

A known example of such a process is called SKIN TECHNOLOGY from BYK Netherlands B.V.

EXAMPLES

TABLE 1

Materials used (Reference, supplier and description)

| Reference | Material name | Supplier | Description |
|---|---|---|---|
| PLA 1 | Ingeo 2003 | Natureworks LLC | Transparent general purpose Polylactic acid (PLA) extrusion grade. MFR: 6 g/10 min [210° C., 2.16 kg]) |
| Joncryl | Joncryl ADR 4368 | BASF Resins B.V. | Acrylate copolymer, solid oligomeric chain extender; $M_n$ = 3000 g/mol |
| PLA-g-AS | PLA-g-AS | | Polylactic acid (PLA) grafted with Acrylic acid. The acid number is 40 mg KOH/g (after grafting). |

In several melt processing experiments A-F a polylactic acid (Ingeo 2003) was mixed and melt processed together with additives as indicated in Table 2 in an extruder during a melt processing time indicated in the Table. In comparative experiment A no additive is used. In comparative experiment B and D only additive i), which is Joncryl ADR 4368, is used. In experiments C, E and F, component i) Joncryl and component ii) PLA-g-AS are both used as additives. In these experiments C, E and F, the weight ratio between the component i) Joncryl and component ii) PLA-g-AS In the melt is 1:1.

In the experiments C and E the additives i) and ii) may be added seperately into the feed stream of the extruder or the additives i) and ii) may be added as a pre-mix composition into the feed stream at once. In a particular example, the additives i) and ii) may be added as compacted particles, each containing particles of additive i) and particles of additive ii). The additives i) and ii) used for experiment F were processed, prior to addition into the extrudate, according to the closed end pellet process (known as SKIN TECHNOLOGY from BYK Netherlands B.V.) to prepare closed end pellets thereof. The core material of the closed end pellets contains the additive i), Joncryl ADR 4368, and the outer layer of the closed end pellets contains the additive ii), the grafted polylactic acid PLA-g-AS, wherein the outer layer encapsulates the core material substantially completely. In experiment F the prepared closed end pellets were added to the main feed in the extruder.

Table 2 shows the amount of polylactic acid (Ingeo 2003) and the amount of additives used in the melt processing experiments.

TABLE 2 melt processing compositions and melt processing time

| Example | PLA 1 [wt %] | Additive i) | Additive i) [wt %] | Additive ii) | Additive ii) [wt %] | Melt processing time [s] |
|---|---|---|---|---|---|---|
| A* | 100% | — | — | — | — | 180 |
| B* | 99.5% | Joncryl | 0.5% | — | — | 180 |
| C | 99.0% | Joncryl | 0.5% | PLA-g-AS | 0.5% | 180 |
| D* | 99.5% | Joncryl | 0.5% | — | — | 45 |
| E | 99.0% | Joncryl | 0.5% | PLA-g-AS | 0.5% | 45 |
| F | 99.0% | Joncryl | 0.5% | PLA-g-AS | 0.5% | 45 |

The examples marked with "*" are not part of the invention, but are used as comparison examples.

The resulting extrudates of the experiments A-F were tested on die swell properties and melt strength properties in accordance with the measurement methods described above. The die swell number SA (relaxed) and the melt strength are indicated in Table 3.

TABLE 3 die swell number SA (relaxed) and melt strength of extrudate A-F

| Example | Die swell SA relaxed | F max [cN] |
|---|---|---|
| A* | 0.07 | 0.5 |
| B* | 1.08 | 40.6 |
| C | 1.25 | 55.8 |
| D* | 0.52 | 12.7 |
| E | 1.05 | 35.8 |
| F | 1.20 | 51.8 |

The results indicate that the addition of a mixture of PLA-g-AS and the Joncryl to the polylactic acid main component Ingeo 2003 raises the dies swell number SA (relaxed) and the melt strength considerably when maintaining the same melt processing time, see experiments B*versus C (at 180 seconds) and experiments D*versus E (at 45 seconds). Additionally, it is possible to obtain a reasonable die swell level and melt strength in a shorter time, when adding the combination of PLA-g-AS and the Joncryl instead of adding the Joncryl additive only, see experiments B*versus E.

Additionally, the experiment F demonstrates that skin-core particles containing the component Joncryl in the core of the particles and the component PLA-g-AS in the outer layer of the particles even further raises the die swell number SA (relaxed) and the melt strength when maintaining the same melt processing time and the same amounts of components in the melt process. See the experiment E versus F.

The invention claimed is:

1. A composition comprising an epoxide functional polymer comprising epoxide functional groups, wherein the epoxide functional polymer has a number average molecular weight of 1000 to 10,000 g/mol, determined according to DIN 55672 part 2 (year: 2008), and a grafted polylactic acid, wherein the polylactic acid is grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g, determined according to DIN EN ISO 2114.

2. The composition according to claim 1, wherein the epoxide functional polymer is a copolymer being a polymerization product of an epoxide functional ethylenically unsaturated polymerizable monomer and another ethylenically unsaturated polymerizable monomer.

3. The composition according to claim 1, wherein the grafted polylactic acid is grafted by a mixture of monomers comprising the acid-functional ethylenically unsaturated polymerizable monomer and/or the acid anhydride-functional ethylenically unsaturated polymerizable monomer and at least one ethylenically unsaturated polymerizable comonomer containing no acid-functional groups and no acid anhydride functional groups.

4. The composition according to claim 1, wherein the composition comprises particles comprising cores and a first coating covering at least a part of the surface of the cores, wherein the cores comprise the epoxide functional polymer and the first coating comprises the grafted polylactic acid.

5. The composition according to claim 4, wherein the first coating additionally comprises another polylactic acid containing carboxylic acid groups in an amount from 1.0 to at most 10.0 mg KOH/g.

6. The composition according to claim 1, wherein the composition comprises a blend comprising particles containing the epoxide functional polymer and particles containing the grafted polylactic acid.

7. The composition according to claim 1, wherein the weight ratio between the epoxide functional polymer and the grafted polylactic acid is from 2:1 to 1:2.

8. A method for processing a polylactic acid blend, the method comprising:
providing components comprising:
a polylactic acid containing carboxylic acid groups in an amount from 1.0 to at most 10.0 mg KOH/g,
an epoxide functional polymer comprising epoxide functional groups, wherein the epoxide functional polymer has a number average molecular weight of 1000 to 10.000 g/mol, and
a grafted polylactic acid, wherein the polylactic acid is grafted with an acid-functional ethylenically unsaturated polymerizable monomer and/or an acid anhydride-functional ethylenically unsaturated polymerizable monomer and has a total amount of carboxylic acid groups and carboxylic acid anhydride groups between 10.0 and 60.0 mg KOH/g;
mixing the components; and
melt processing the mixture.

9. The method according to claim 8, wherein providing the components comprises providing a composition comprising the epoxide functional polymer and the grafted polylactic acid.

10. The method according to claim 9, wherein the composition comprises:
particles comprising cores and a first coating covering at least a part of the surface of the cores, wherein the cores comprise the epoxide functional polymer and the first coating comprises the grafted polylactic acid.

11. The method according to claim 8, wherein the grafted polylactic acid is provided in an amount of 0.1 to 2.0% by weight, based on a sum of the weights of the polylactic acid, the epoxide functional polymer, and the grafted polylactic acid.

12. The method according to claim 8, wherein the epoxide functional polymer is a copolymer being a polymerization product of an epoxide functional ethylenically unsaturated polymerizable monomer and another ethylenically unsaturated polymerizable monomer.

13. The method according to claim 8, wherein the epoxide functional polymer is provided in an amount of 0.1 to 2.0% by weight, based on a sum of the weights of the polylactic acid, the epoxide functional polymer, and the grafted polylactic acid.

14. The method according to claim 8, wherein the melt processing is performed from 30 seconds to 120 seconds at a temperature between 150° C. and 250° C.

15. The method according to claim 8, wherein the melt processing comprises forming a film that comprises the melt processed mixture.

16. A polylactic acid product obtained by the method according to claim 8.

17. The polylactic acid product according to claim 16, having the shape of a film.

18. The method according to claim 8, wherein the grafted polylactic acid is provided in an amount of 0.1 to 1.0% by weight, based on a sum of the weights of the polylactic acid, the epoxide functional polymer, and the grafted polylactic acid.

19. The method according to claim 8, wherein the epoxide functional polymer is provided in an amount of 0.1 to 1.0% by weight, based on a sum of the weights of the polylactic acid, the epoxide functional polymer, and the grafted polylactic acid.

20. The method according to claim 8, wherein the melt processing is performed from 30 seconds to 60 seconds at a temperature between 150° C. and 250° C.

21. The method according to claim 9, wherein the composition comprises:
a blend comprising particles containing the epoxide functional polymer and particles containing grafted polylactic acid.

* * * * *